Oct. 12, 1948.  W. W. WATROUS, JR  2,451,184
PROTECTIVE DEVICE AND THE MANUFACTURE THEREOF
Filed Oct. 16, 1942  2 Sheets-Sheet 1
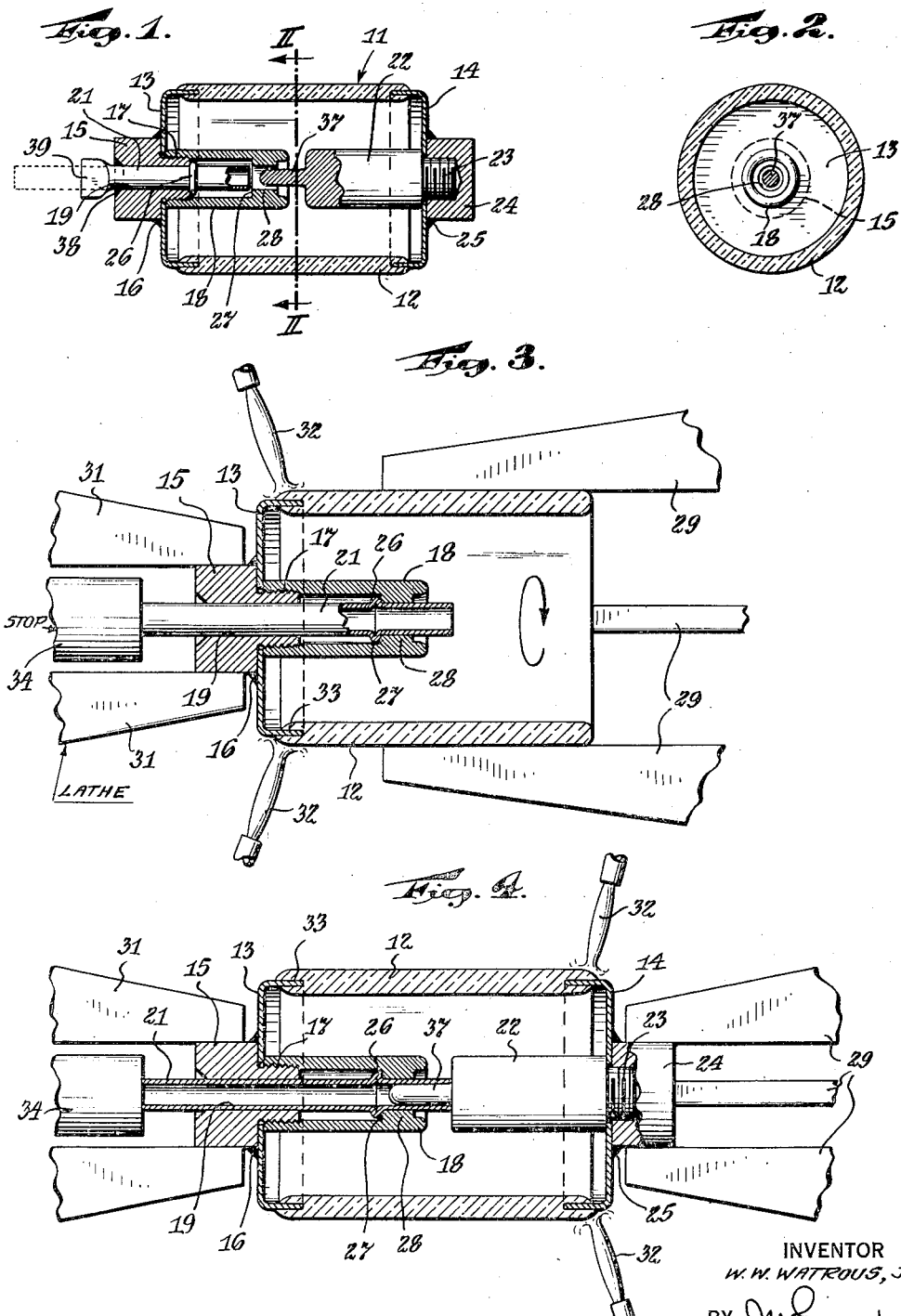
INVENTOR
W. W. WATROUS, JR.
BY
ATTORNEY Oct. 12, 1948.   W. W. WATROUS, JR   2,451,184
PROTECTIVE DEVICE AND THE MANUFACTURE THEREOF
Filed Oct. 16, 1942   2 Sheets-Sheet 2
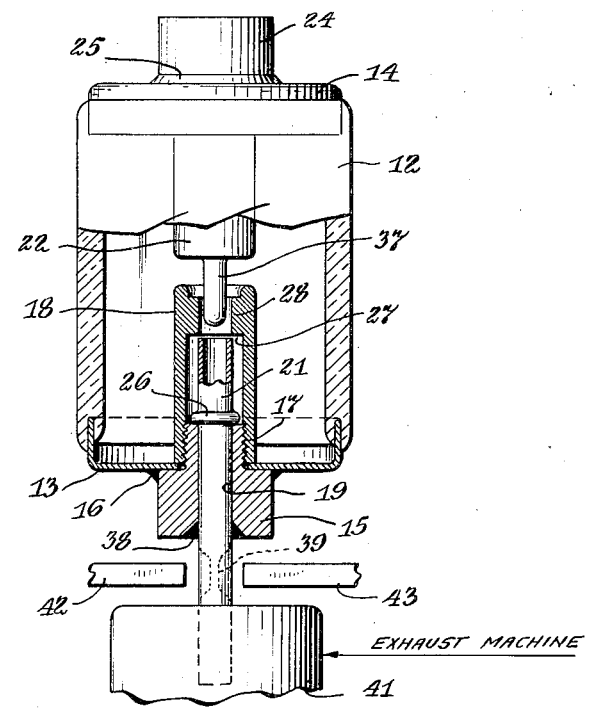
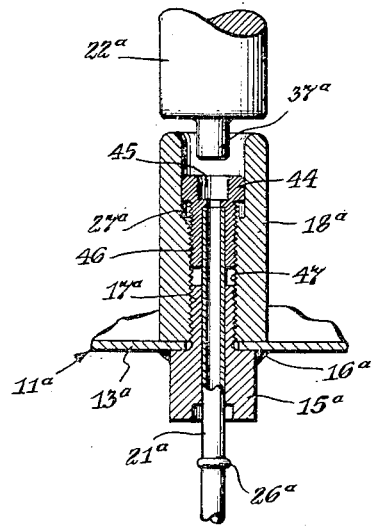
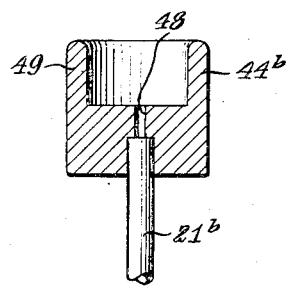
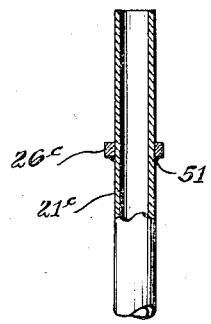
INVENTOR
W. W. WATROUS, JR.
BY
ATTORNEY Patented Oct. 12, 1948

2,451,184

UNITED STATES PATENT OFFICE 2,451,184

PROTECTIVE DEVICE AND THE MANUFACTURE THEREOF

Ward W. Watrous, Jr., Chatham, N. J., assignor to Westinghouse Electric Corporation, East Pittsburgh, Pa., a corporation of Pennsylvania Application October 16, 1942, Serial No. 462,258

9 Claims. (Cl. 250—27.5)

This invention relates to automatic switches used as protective devices in connection with high frequency transmission and reception.

The principal object of my invention, generally considered, is to provide an automatic radial-type spark gap switch of extreme accuracy, insofar as the spacing of the electrodes is concerned, and a method of manufacturing such a device.

Another object of my invention is to provide a protective device for electricity of high frequency, comprising a pair of electrodes, gas-tight means enclosing said electrodes, a tube which initially fits within one and receives the other of said electrodes, and means for withdrawing said tube to leave a spark-gap space of the desired distance and character between said electrodes.

A further object of my invention is the provision of a method of accurately positioning electrodes in a discharge device comprising fitting a tube within one of said electrodes, fitting the other electrode within said tube, and withdrawing said tube to leave said electrodes spaced a desired distance.

Other objects and advantages of the invention, relating to the particular arrangement and construction of the various parts, will become apparent as the description proceeds.

Referring to the drawings—

Fig. 1 is an axial sectional view, with parts in elevation, of a protective device embodying my invention.

Fig. 2 is a transverse sectional view on the line II—II of Fig. 1, in the direction of the arrows.

Fig. 3 is an axial sectional view, with parts in elevation, showing parts of a device embodying my invention during the course of manufacture, on a somewhat larger scale than that of Figs. 1 and 2.

Fig. 4 is a view corresponding to Fig. 3 but illustrating a further stage in the manufacture of devices embodying my invention.

Fig. 5 is a view corresponding to Fig. 4 but showing the device just prior to sealing off.

Fig. 6 is a fragmentary view corresponding to Fig. 5 but showing another embodiment of my invention.

Fig. 7 is a sectional view, with parts in elevation, of a modified form of spacing tube.

Fig. 8 is a view corresponding to Fig. 7 but showing a further modification of the spacing tube.

The present application discloses a protector tube which is considered an improvement over that described and claimed in my Patent No. 2,288,861, dated July 7, 1942, and particularly the embodiments in which a radial discharge, as distinguished from one axial of the electrodes, is provided for. Tests have indicated superiority of operation when a radial-type spark gap is used for sparking during transmission to keep the relatively-high sending energy from the receiving apparatus, while not interfering with reception, in connection with such equipment as that used for locating aircraft. By radial-type gap, I mean one in which the major discharge occurs between a convex and a concave surface, usually in cylindrical form.

Such a gap is very difficult to properly manufacture, as it is extremely hard to accurately align one electrode within the other. Eccentric alignment results in concentration of the discharge and increased electrostatic capacity, both of which may seriously affect operation. In extreme cases of mis-alignment, the electrode surfaces may actually touch, thus shorting out the gap and rendering it worthless. If such a gap has been made, it is very difficult to measure the spacing in accordance with preceding practice. There has been some thought of reducing the electrode spacing to the order of .01 inch. Such a small space requires accuracy well above that achievable by prior technique.

In accordance with the present invention, I am able to accurately obtain not only radial spacing but also longitudinal spacing. In a preferred form, the invention involves a movable tube which can conveniently be an exhaust tube, located in such a manner that it acts as a spacer and guide during the glassing operation, but can be withdrawn from the discharge region after such an operation. The tube may be withdrawn entirely after the glassing operation, or preferably soldered in a fixed location and used for exhaust purposes.

Referring to the drawings in detail, like parts being designated by like reference characters, and first considering the embodiment of my invention illustrated in Figs. 1 and 2, there is shown a protector tube 11 comprising a glass envelope 12, hollow cylindrical in form and with its ends closed by caps 13 and 14, desirably formed of "Kovar" or other suitable material sealed to the glass. "Kovar" is an alloy containing 28.7 to 29.2% nickel, 17.3 to 17.8% cobalt, 52.9 to 53.4% iron, not more than .06% carbon, not more than .5% manganese, and not more than .2% silicon. If "Kovar" is used, I prefer to employ glass, Corning #704, which is a soft borosilicate glass. The cap 13 carries a terminal 15 which may be formed of steel welded, soldered, or both, as indicated at 16, to the "Kovar" cap. The inner portion of the terminal is reduced in section and threaded as indicated at 17, said threaded portion carrying a hollow or female electrode 18 which may be formed of aluminum and correspondingly internally threaded and applied to the threaded portion 17 of the terminal. The terminal member 15 has an axial passage 19 therethrough receiving a movable tube 21 which may be formed of steel and adapted for exhausting purposes. This tube has a normal outside diameter corresponding with a minimum internal diameter of the female electrode 18, and a wall thickness corresponding with the desired radial spacing of said electrode with respect to a male electrode. The male electrode 22 is also desirably formed of aluminum and carried by the cap 14, as by having a reduced threaded extension 23 fitting the correspondingly threaded terminal 24 thereon, said terminal being desirably welded, soldered, or both, to said cap as indicated at 25.

In order to limit relative movement between the combined spacing and exhaust tube 21 and the electrode 18, said exhaust tube has a stop portion 26, which may be formed by upsetting an intermediate portion thereof, and which permits longitudinal movement of said tube only from the position shown in Fig. 1, where it abuts the terminal 15, to that shown in Fig. 3 where it abuts a shoulder 27 provided by an interior annular boss 28 on the female electrode 18. It will, therefore, be seen that movement of the spacing tube 21 is from the initial or spacing position, shown in Fig. 3, to that shown in Fig. 1 where it leaves a desired space between the electrodes.

Referring now to Fig. 3 which illustrates parts of the device in a preliminary stage of manufacture, the hollow cylindrical glass tube or envelope portion 12 is held in lathe jaws 29 while the terminal portion 15 is held in cooperating lathe jaws 31, so that both the glass envelope portion 12 and the terminal member 15 with its assembled cap 13, female electrode 18 and spacing tube 21 may be rotated at the same speed, heated by fires 32, gradually brought together, and sealed as indicated at 33.

With the spacing tube 21 in the extreme inner position, as effected by engagement of a stop 34 therewith as shown in Fig. 4, and with the jaws 31 still holding the terminal 15 and its associated parts, now including the glass envelope portion 12, the terminal 24 and its associated cap 14 and male electrode 22 are held in lathe jaws 29 and rotated at the same speed, heated by fires 32, and the parts gradually brought together until the cap 14 is sealed to the other or right hand end of the glass envelope portion 12, the reduced end or effective portion 37 of the male electrode 22 fitting the tube 21 which controls the desired spacing between it and the female electrode 18. The longitudinal spacing is controlled by the length of the spacing tube beyond the stop or enlarged portion 26, while the radial spacing is controlled by the wall thickness of said tube; the fit between the associated parts being snug and the wall thickness being accurate so that extreme accuracy in positioning the electrodes may be effected.

Fig. 5 shows the alignment of the parts of the protector tube after both caps have been sealed to the envelope 12 and the spacing tube 21 withdrawn to its extreme outer position where its stop portion 26 engages the terminal member 15, whereupon the desired space, both radial and axial, is left between the adjacent or effective portions of the associated electrodes. The device is made air-tight, as by soldering the movable tube 21 to the terminal member 15, as indicated at 38. The tube 21 may then be tipped off as indicated at 39, after exhausting and filling with the desired gas, as by means of exhaust machine 41. Tipping-off may be accomplished by squeezing the exhaust tube 21 between electrodes 42 and 43, and then welding it shut and removing the portion beyond the weld.

In Fig. 6 I have shown the modified portions of an alternative form of protector tube 11$^a$ in which the cap 13$^a$ carries a terminal 15$^a$ secured thereto as indicated at 16$^a$, as in the preceding embodiment. The inner threaded portion 17$^a$ of the terminal also carries a female electrode 18$^a$, which is formed somewhat different from the electrode 18 of the preceding embodiment, in that the effective shoulder 27$^a$ faces toward the male electrode 22$^a$ rather than away from it and serves to limit inward rather than outward movement of the tube 21$^a$. The movable exhaust tube 21$^a$ is of smaller relative diameter than tube 21 of the preceding embodiment and carries an auxiliary spacing or alignment tip 44, which may be formed of aluminum or nickel, having a pocket 45 adapted to accurately fit the effective tip or reduced portion 37$^a$ of the male electrode 22$^a$, the maximum outer diameter thereof corresponding with the inner diameter of the effective or end portion of the female electrode 18$^a$.

The spacing tip has reduced threaded portion 46 fitting a correspondingly threaded portion 47 of the female electrode 18$^a$ and suitably secured as by welding or forced fit on the movable tube 21$^a$ so that it may be turned to spacing position, or until the shoulder 26$^a$ thereon engages the terminal 15$^a$, as in Figs. 3 and 4 in connection with the preceding embodiment. In such position the male electrode 22$^a$ is nested with the tip 44 during manufacture. After assembly, the tube 21$^a$ is rotated to withdraw the tip 44 to its extreme outward position, corresponding with the showing in Fig. 5, where it engages the terminal 15$^a$, leaving the associated electrodes 18$^a$ and 22$^a$ in the desired accurately-spaced position, corresponding with the showing of Figs. 1 and 2, the thickness of the tip wall which defines the pocket 45 determining the radial, and the movement of said tip determining the axial electrode spacing. The device may then be finished as described in connection with the preceding embodiment.

Fig. 7 shows a spacing tip 44$^b$ which is not integral with the movable exhaust tube 21$^b$ but rather secured thereto as by welding or forced fit, said spacing tip having an opening 48 communicating with said tube and an outstanding peripheral hollow cylindrical flange 49, the radial thickness of which corresponds with the desired radial spacing between the associated electrodes, as in the preceding embodiment. It will be understood that this tip may be employed as an alternative to the tip 44 of the preceding embodiment and all the parts not illustrated may correspond with those of one of the preceding embodiments.

Fig. 8 illustrates an alternate spacing tube 21$^c$ in which the stop or shoulder portion thereof, instead of being formed by upsetting, comprises an annular ring 26$^c$ fitted thereto and secured in position as by means of solder 51. In this embodiment the parts not shown may correspond with those of any of the preceding embodiments.

From the foregoing it will be seen that I have disclosed an improved form of protector tube, as well as an improved method of assembling the parts, whereby accurate spacing between the electrodes, both radial and longitudinal, may be conveniently effected.

Although preferred embodiments of my invention have been disclosed, it will be understood that modifications may be made within the spirit and scope of the appended claims.

I claim:

1. The method of positioning electrodes in a discharge device comprising closely fitting a spacing tube of limited longitudinal movement within one of said electrodes, closely fitting the other electrode within said tube, while said spacing tube is positioned with respect to said one electrode nearest said other electrode, and withdrawing said tube from said other electrode to the opposite extreme position of limited movement, leaving said electrodes spaced apart the desired distance.

2. The method of positioning electrodes in a discharge device comprising sealing one of said electrodes in place with respect to an envelope, closely fitting a spacing tube of limited longitudinal movement within said electrode, closely nesting the other electrode in said tube when the latter is in its extreme inward position, sealing said other electrode in place with respect to said envelope, and withdrawing said tube from said other electrode to its outermost fixed position, whereby the innermost position of said tube determines the longitudinal spacing of the electrodes and the wall thickness of the electrode-receiving portion of said tube determines the radial spacing.

3. The method of positioning a male electrode with respect to a female electrode in a discharge device, comprising fitting a movable exhaust tube within said female electrode, sealing said female electrode within an envelope fitting the male electrode within said exhaust tube when the latter is in innermost position, sealing said male electrode within said envelope, and withdrawing said exhaust tube to outermost fixed position leaving the desired space between said electrodes.

4. A discharge device comprising an electrode with an axial cylindrical aperture, another electrode with a cylindrical portion projecting into said aperture and coaxial therewith, an envelope for said device and enclosing said electrodes, and a combination spacing and exhaust tube, coaxial with said electrodes, whose outer diameter is substantially equal to the diameter of the electrode aperture and whose inner diameter is substantially equal to the diameter of the projecting portion of said other electrode, whereby it serves to accurately position said electrodes both axially and radially during manufacture, and is withdrawn to the outermost position and sealed with respect to said envelope after said positioning operation.

5. A protective device for electricity of high frequency comprising a pair of electrodes, means enclosing said electrodes, and a spacing tube which initially fits within one and receives the other of said electrodes, said tube being initially withdrawable to an outer position leaving a spark-gap space, and means sealing said tube in said outer position leaving a spark-gap of the desired distance between said electrodes.

6. A protective device for electricity of high frequency comprising a female electrode, a spacing tube therein and initially longitudinally movable with respect thereto, a male electrode fitting the inner end of said spacing tube, means enclosing said electrodes, and means sealing said spacing tube in extreme outermost position with respect to said female electrode, whereby a spark-gap space of the desired distance and character between said electrodes is produced.

7. A protective device for electricity of high frequency comprising a female electrode, a spacing tube longitudinally slidable with respect thereto, a male electrode snugly nestable with the inner end of said spacing tube, a cap carrying each electrode, a glass envelope portion covering the space between said caps, said tube having shoulder means for limiting its movement, and means sealing said spacing tube with respect to said female electrode leaving a gap between said electrodes of the desired distance and character.

8. A protective device for electricity of high frequency comprising a female electrode, an exhaust tube longitudinally sliadable with respect thereto, a spacing tip carried by the inner end portion of said tube, a male electrode snugly nestable with the inner end of said tip, a cap carrying each electrode, a glass envelope portion covering the space between said caps, said tube having shoulder means for limiting its movement, said tip being threaded into said female electrode, and means sealing said spacing tube with respect to said female electrode leaving a gap between said electrodes of the desired distance and character.

9. A protective device for electricity of high frequency comprising a female electrode, an exhaust tube longitudinally slidable with respect thereto, a spacing tip carried by the inner end portion of said tube, a male electrode snugly nestable with the inner end of said tip, a cap carrying each electrode, a glass envelope portion covering the space between said caps, said tube having shoulder means for limiting its movement, and means sealing said spacing tube with respect to said female electrode leaving a gap between said electrodes of the desired distance and character.

WARD W. WATROUS, Jr.

REFERENCES CITED

The following references are of record in the file of this patent:

UNITED STATES PATENTS

| Number | Name | Date |
|---|---|---|
| 1,656,956 | Schroter | Jan. 24, 1928 |
| 1,930,088 | Foulke | Oct. 10, 1933 |
| 2,174,853 | Bowie | Oct. 3, 1939 |
| 2,225,465 | Scharfnagel | Dec. 17, 1940 |
| 2,272,882 | Brown | Feb. 10, 1942 |
| 2,320,941 | Litton | June 1, 1943 |
| 2,397,982 | Salzberg | Apr. 9, 1946 |
| 2,422,324 | Watrous, Jr. | June 17, 1947 |